T. R. Hartell,
Making Glass Stoppers.
No 949. Reissued Apr. 24, 1860.
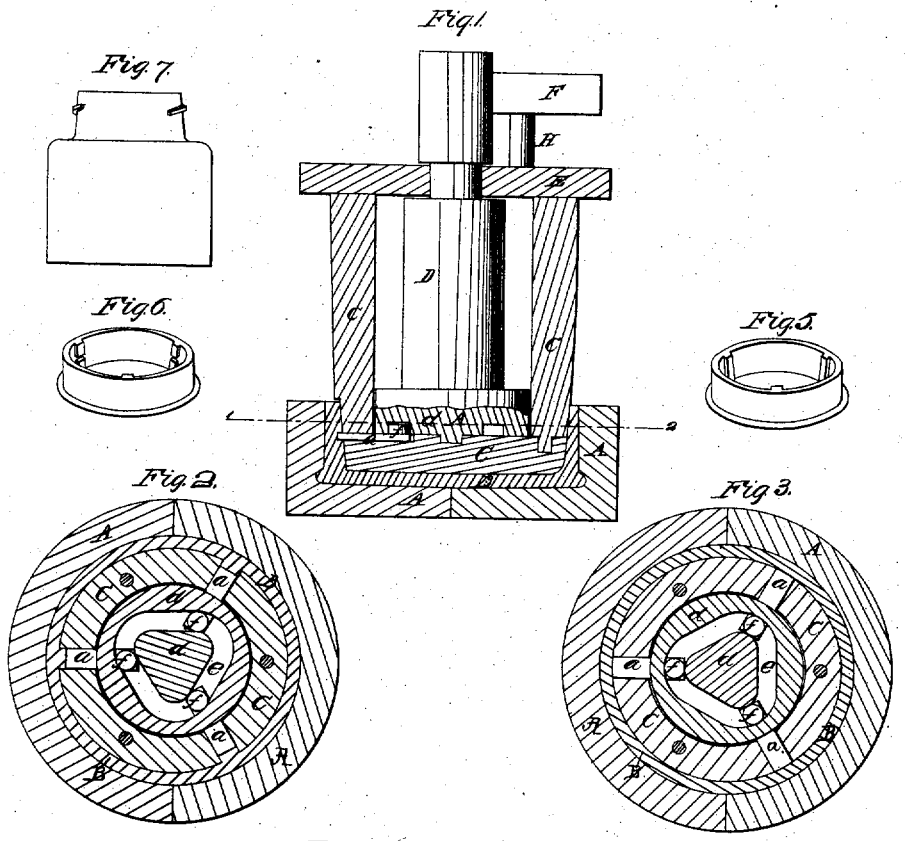
Witnesses:
Henry Howden
Chas. Howson
Inventor:
Thos. R. Hartell
AM. PHOTO-LITHO. CO. N.Y. (OSBORNE'S PROCESS)

UNITED STATES PATENT OFFICE.

THOMAS R. HARTELL, OF PHILADELPHIA, PENNSYLVANIA.

IMPROVEMENT IN APPARATUS FOR MAKING GLASS STOPPERS FOR BOTTLES, &c.

Specification forming part of Letters Patent No. 21,831, dated October 19, 1858; Reissue No. 949, dated April 24, 1860.

*To all whom it may concern:*

Be it known that I, THOMAS R. HARTELL, of the city of Philadelphia, and State of Pennsylvania, have invented a new and useful Improved Apparatus for Manufacturing Stoppers for Bottles and other Vessels; and I do hereby declare the following to be a full, clear, and exact description of the same, reference being had to the accompanying drawings, and to the letters of reference marked thereon.

My invention relates to that class of vessels and caps in which the latter are secured to the former by inclined planes on one and projections on the other; and my invention, which relates especially to the formation of the projections, consists in the employment of a plunger or die with radial punches or equivalent devices for forming the desired projections and certain vertical recesses which allow the plunger to be withdrawn after the formation of the said projections, as fully described hereinafter.

In order to enable others to practice my invention, I will now proceed to describe the manner in which I carry it into effect.

On reference to the accompanying drawings, which forms a part of this specification, Figure 1 is a sectional elevation of the apparatus for practicing my improved mode of forming the fastenings for the caps of preserving and other vessels; Fig. 2, a sectional plan on the line 1 2, Fig. 1; Fig. 3, the same as Fig. 2, but with the radial punches in a different position; Fig. 4, a view of the apparatus as applied to the grinding of the caps; Fig. 5, a perspective view of the cap or stopper inverted, and prior to the formation of the indentations in the ribs; Fig. 6, a perspective view of the stopper after the projections have been formed; Fig. 7, an exterior view of the neck of the vessel to which the stopper or cap has to be applied.

A is a mold or box for receiving the molten glass or other plastic material from which the cap B has to be formed; C, the plunger or die for forming the interior of the cup, and *a a a* the radial punches. The box A is in two halves, held together during the formation of the cap by any convenient appliances, and readily separated when the cap has been formed, so that the latter, with any moldings or devices which may be embossed on its outer surface, may be easily withdrawn.

The plunger or die C has a circular recess or chamber concentric with the exterior, and in the bottom of this chamber fits a disk, *d*, attached to or forming a part of the spindle, D, which is guided laterally as well as retained in its proper vertical position by the transverse bar E, which is secured to the top of the block. An arm, F, projects from the upper end of the spindle D, serving to turn the latter partially round to an extent limited by pins H, which project above the transverse bar E. On the under side of the disk *d* is a recess of the form of an equilateral triangle with rounded corners. Into this recess fits the rounded projection *f* on one end of each of the radial punches *a a a*, which are arranged to slide in grooves formed in the bottom of the recess of the block C, and to fit snugly into and slide freely in orifices passing through the sides of the plungers. At the side of the latter and where each of the orifices for the reception of the punches is situated, a vertical recess, as represented in Figs. 1 and 2, is formed, for a purpose which will be rendered apparent hereinafter.

In forming the cap the molten glass or other plastic material is first deposited in the mold A, when the plunger C (with its shaft D turned so that the recess *e* and the punches *a* are in a position shown in Fig. 2) is pressed into the plastic material. A plain circular recess with three vertical ribs corresponding to the three vertical recesses of the plunger is formed in the material which, if removed from the mold and from the plunger, would present the appearance represented in Fig. 5. Prior to withdrawing the plunger, however, and while the material is still in a plastic state, the operator turns the spindle D until the disk assumes the position shown in Fig. 3. By this movement of the disk the punches *a* are projected outward simultaneously, forming indentations in the ribs previously alluded to as having been produced by the vertical recess of the plunger C. The shaft D is now turned to its former position, the punches thereby withdrawn from their notches, when the plunger, owing to its vertical recesses, can be withdrawn from the plastic material, after which the mold is separated and the newly-formed stopper or cap, which has now assumed the form represented in Fig. 6, is completed and may, if necessary, be submitted to a grinding process. This is performed by an instrument similar to that above described. The spindle D, however, of the plunger is secured to the spindle of the back head-stock, M, of an ordinary lathe, the stopper or cap being "chucked" to the face-plate *n* of the front head-stock, N. Suitable grinding material being applied to the inside of the cap and the latter caused to revolve, the end of the plunger (which in this instance is smaller in diameter than that by which the interior of the cap was formed) is gradually brought to bear on the bottom of the cap, which is soon reduced to a uniform level. The block is then gradually turned round, which (as its spindle remains stationary) serves to project the punches outward, when the grinding material which adheres to their ends soon reduces the notches in the vertical strips to a uniform level surface, which must of necessity be parallel to the previously-ground surface of the bottom of the cap.

The importance of grinding the notches true with the bottom of the stopper will be better understood by referring to the Fig. 7, in which is represented the neck of the vessel to which the stopper or cap is to be applied.

On the exterior of the neck are three inclined projections, arranged to slide in the notches of the cap. The top of the vessel's mouth is ground perfectly true and the inclined projections arranged at equal distances from the edge of the vessel, so that when the cap is dropped over the mouth and turned round, thereby causing the inclined projections to catch into the notches, it is evident that the ground bottom of the cap must bear with accuracy on the ground edge of the vessel's mouth. Should the notches in the cap, however, not be true with the ground bottom, it will be evident that the two grooved surfaces cannot be fitted tightly together.

Although I prefer three radial punches to any other number, four or more may be used to advantage in forming stoppers or caps for the larger class of vessels.

I claim as my invention and desire to secure by Letters Patent—

Forming the projections on the cap of the vessel by means of the radial punches or their equivalents, and the vertical recesses on the plunger or die, which recesses allow the said plunger to be withdrawn after the formation of the projection, as set forth.

In testimony whereof I have signed my name to this specification in the presence of two subscribing witnesses.

THOS. R. HARTELL.

Witnesses:
HENRY HOWSON,
CHARLES D. FREEMAN.